March 3, 1970  J. STRANGE  3,498,650

FASTENING DEVICE

Filed March 6, 1968  2 Sheets-Sheet 1

INVENTOR.
BY JOHN STRANGE
Teare, Teare & Sammon
ATTORNEYS

INVENTOR
JOHN STRANGE
BY
Teare, Teare & Sammon
ATTORNEYS

United States Patent Office 3,498,650
Patented Mar. 3, 1970

3,498,650
FASTENING DEVICE
John Strange, Llanishen, Cardiff, Wales, assignor to Tinnerman Products, Inc., Cleveland, Ohio, a corporation of Ohio
Filed Mar. 6, 1968, Ser. No. 710,898
Int. Cl. F16d 1/06; F16b 3/00
U.S. Cl. 287—53                                 10 Claims

ABSTRACT OF THE DISCLOSURE

A fastening device for connecting a rotatable member to a shaft. The device comprises an endless cylindrical collar which is provided with an integral, radially inwardly extending tongue and at least one deformable region for resilient clamping engagement with the rotatable member for securement of the shaft therewith.

BACKGROUND OF THE INVENTION

The present invention relates to a means for connecting a rotatable member to a shaft. More particularly, the present invention relates to a fastening device for connecting the integral hub of a knob, such as the control knob of a radio or the like, to a corresponding control shaft.

Heretofore, spring collars of cylindrical or partially cylindrical configuration with inwardly projecting tongues have been employed. These tongues were disposed at one end of the collar or intermediate the collar ends. While such structures are capable of effective connection of a rotatable member to a shaft, rod, spindle or the like (herein referred to generically as a shaft), such collars when fabricated from a metal such as spring steel tend to score even metal shafts. Hence, they are not entirely suitable for use on shafts of polymeric or plastic material.

SUMMARY OF THE INVENTION

The fastening device in accordance with the present invention comprises an endless collar provided with an integral, radially inwardly extending tongue and at least one deformable region. This device is operable to connect a rotatable member to a shaft by resilient clamping action for their mutual rotation. By providing the rotatable member with a slot through which the fastener tongue may radially extend and both the rotatable member and the shaft with coacting stop means, the tongue of the fastening device will spring bias the rotatable member into coacting engagement with the shaft when the collar is disposed about a part of the rotatable member, deforming the deformable region.

This connection is achieved without the necessity of collar ends which might score or otherwise damage the parts. In addition, a resilient biasing of the parts into tight fitting connection without adverse effects from vibration, loose tolerance and wear is achieved. Further, a more economical fabrication is provided, yet which is of a simple and durable construction.

BRIEF DESCRIPTION OF THE DRAWINGS

FIG. 2 is a fragmentary assembly view, partially in section, showing the fastening device of the invention prior to mounting with the rotatable member of FIG. 1 for securement of a shaft or the like;

FIG. 4 is an enlarged front elevation view showing the fastening device of FIG. 3 for resilient clamping securement of the rotatable member of FIG. 1 with a shaft or the like;

DESCRIPTION OF THE PREFERRED EMBODIMENTS

Figure 1:
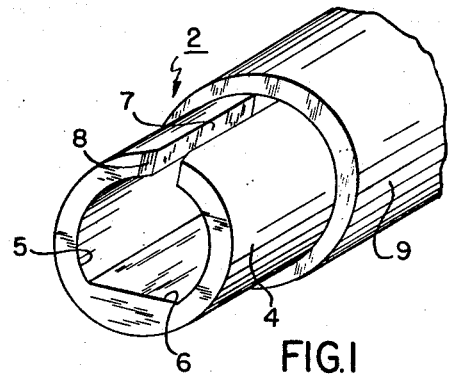
FIG. 1 is a fragmentary, generally perspective view showing one end of a rotatable member, such as for use with radio or the like, and which may be employed with the fastening device of the invention.
Figure 2:
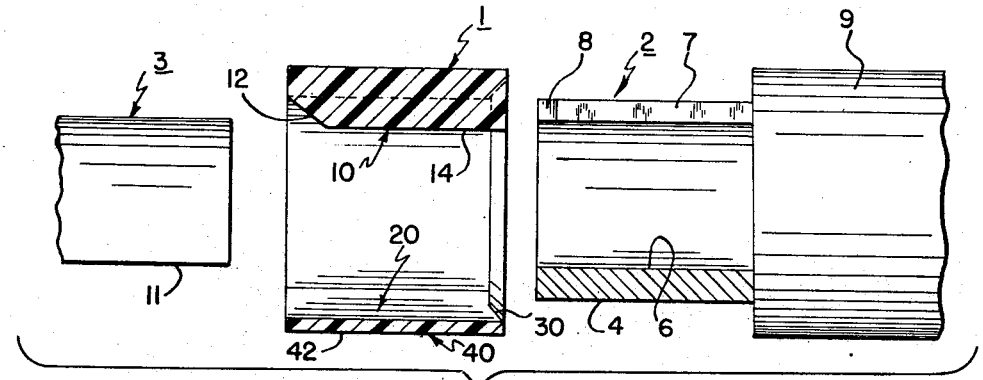
Figure 3:
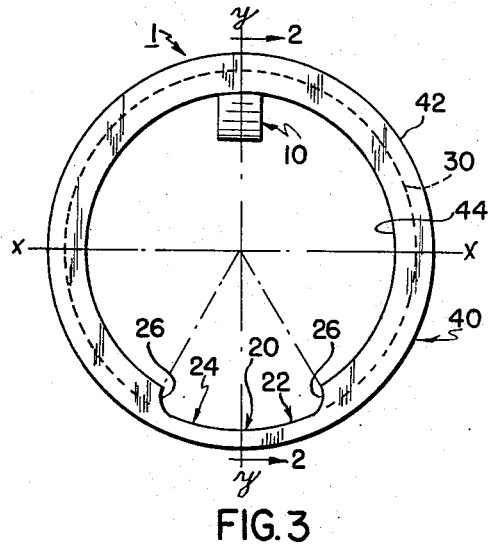
FIG. 3 is an enlarged elevation view of the fastening device made in accordance with the invention.

In general, and with reference to FIGS. 1 to 3, the fastening device 1 of the present invention comprises an endless collar 40 of generally cylindrical configuration which is provided with an integral, inwardly projecting tongue 10 and at least one resilient deformable region 20. The collar 40 is adapted to fit around the corresponding cylindrical peripheral surface 4 of a rotatable member 3 with the tongue 10 extending through a slot 7 in the member 2. When the collar 40 is thus disposed and a shaft 3 is introduced into the rotatable member 2, the deformable region 20 is deformed resiliently and imparts a spring bias to the tongue 10, displacing it outwardly.

As shown in FIGS. 2 and 3, the integral tongue 10 extends radially inwardly from the generally cylindrically configured inner surface 44 of the collar along a plane which contains the longitudinal central axis of the collar 40 (which may be defined as the intersection of the vertical plane Y—Y and the horizontal plane X—X). However, the tongue 10 terminates short of intersection with the axis. As seen in FIG. 2, the tongue 10 is provided with an inclined, linearly extending leading edge 12 and an axially extending edge 14. The linearly extending leading edge 12 is inclined at an angle $z$ with respect to the longitudinal central axis (FIG. 6) of the collar 40 and the axially extending edge 14 which may be approximately 25°. This leading edge 12 extends from the inner surface 44 at one end of the collar 40 to its intersection with the axially extending edge 14, thereby providing an angularly disposed camming surface extending from the inside diameter of the collar 40 inwardly to assist in the insertion of a shaft 3.

A deformable region 20 is disposed diametrically oppositely from the tongue 10 where the radial thickness of the collar 40 is less than that at other points of the collar 40; this thickness being approximately one-half the nominal thickness at other points. The deformable region 20 is provided by a shallow longitudinal recess or groove 22 which extends axially of the collar 40 along its inner, generally cylindrical surface 44. This recess 22, which extends the length of the collar 40, is defined by a curved bottom surface 24 and curved or rounded interior edges 26. While the center of curvature of the bottom surface 24 is generally coincident with the longitudinal central axis of the collar, the centers of curvature of the interior edges 26 are not. It is preferred, in this embodiment, that the recess 22 subtend an included angle at the axis of approximately 60°. This angle is bisected by the vertical plane Y—Y which also passes through and bisects the tongue 10. Hence, the radial plane passing through the tongue 10 and the axis also bisects the angle between the transverse circumferential extremities of the deformable region 20. It may also be seen that the deformable region 20, embodied by the recess 22, and the tongue 10 are on opposite sides of the horizontal plane X—X.

The end of the collar remote from the leading edge 12 of the tongue 10 is provided with an inner beveled edge 30 which extends approximately one-half the radial thickness of this end of the collar 40. Thereby, a conical camming surface is provided to assist in insertion of the hub 9 of the rotatable member 2.

The form of an integral hub 9 for a rotatable member 2 which is particularly suited for use with the fastening device 1 of the present invention is shown in FIG. 1. Briefly, this hub 9 is provided with a generally cylindrical outer periphery 4 and an axial bore 5 which is configured to correspond to a shaft member 3. In this instance, a flat 6 is provided in the otherwise generally cylindrical inner surface of the bore 5 which corresponds to a flat 11 on the shaft member 3. A radial slot 7 in the hub 9 is provided to permit proper disposition of the tongue 10 of the fastening device 1. Beveled edges, as at 8, may be provided at the opening of the slot 7 to permit camming and guiding surfaces for insertion of the tongue 10 into the slot 7.

Figure 4:
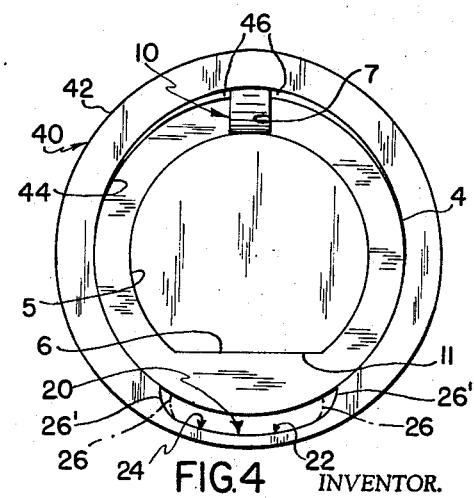

The operation of the fastening device 1 in connecting a rotatable member 2 to a shaft 3 may be seen best with reference to FIGS. 1, 2 and 4. Collar 40 is slipped generally axially over the outer periphery 4 of the hub 9 of the rotatable member, the beveled edge 30 providing a cam bearing and guiding surface for facilitating entry of the hub 9 into inner surface 44 of the collar 40. During this operation the beveled edges 8 of the slot 7 provide a cam bearing and guiding surface to facilitate entry of the tongue 10 into the slot 7 where it is to repose. When the collar 40 has been finally disposed around the outer periphery 40 of the hub 9, the axially extending edge 14 is disposed radially inwardly of the inner surface of the bore 5 in the hub 9. Further, the leading edge 12 is disposed at the outer end of the hub 9 so that it is the initial surface of the tongue 10 which the shaft 3 contacts. With the collar 40 thusly disposed around the hub 9, the shaft 3 with its flat 11 which corresponds to flat 6 of the hub 9 is inserted into the axial bore 5 of the hub 9, flat 11 engaging flat 6. During insertion, the shaft 3 comes into cam bearing engagement with the inclined leading edge 12, initiating the radially outward deflection of the tongue 10. This causes a resilient deformation of the deformable region 20 so that the collar 40 tightly grips the rotatable member 2 and the tongue 10 is given a spring bias. This biasing urges the flats 6 and 11 together in firm abutting engagement to prevent backlash between the hub 9 and the shaft 3. With particular reference to FIG. 4, the condition of the collar 40 in its final, installed position may be seen. The tongue 10 has been deflected outwardly, lifting a portion of the collar 40 out of engagement with the outer periphery 4, as at 46. The interior edges 26 have deformed transversely, being configured with an increased radius of curvature, from their initial configuration 26 (dotted line showing).

While it is preferable that the shaft 3 fit snugly into the axial bore 5, the fastening device 1 of the present invention ensures firm securement even with tolerances contributing to a comparatively loose fit between the hub 9 and the shaft 3. The collar 40 may be conveniently made from a polymeric material, such as Delryn, hard nylon or the like.

Figure 5:
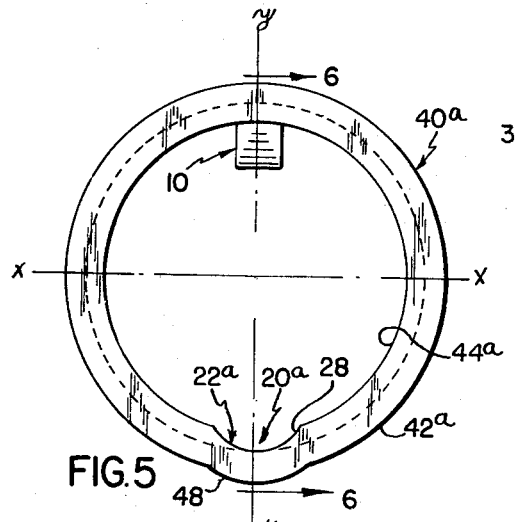
FIG. 5 is an enlarged elevation view of a modification of the fastening device made in accordance with the invention.
Figure 6:
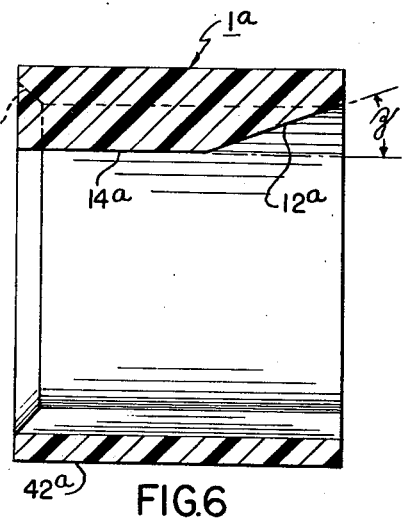
FIG. 6 is a vertical section view taken along the line 6—6 of FIG. 5.

The embodiment of the fastening device shown in FIGS. 5 and 6 is generally similar to the embodiment of FIGS. 2 to 4 (wherein like elements are designated by like reference numerals bearing an $a$ suffix), except for a modified construction of the deformable region 20a. In this embodiment, the deformable region comprises a longitudinal recess or groove 22a of arcuate cross section extending along the inner cylindrical periphery 44a in an axial direction. This recess 22a is defined by a single curved surface 28 which is arcuate in cross section. A corresponding arcuate exterior bulge 48, which is also of arcuate cross section and which also forms a part of the deformable region 20a, extends in a similar axial direction along the outer periphery 42. The centers of curvature of the arcuate recess 22a and the arcuate bulge 48 are disposed between the horizontal plane X—X and the confronting sector of the collar 40a into which the recess 22a is set. The arcuate recess 22a may subtend an included angle of approximately 35°. The thickness of the collar 40a at the deformable region 20a is generally less than the thickness at other points along the collar, preferably being approximately one-half the nominal thickness of the remainder. Again, the vertical plane Y—Y (which includes the tongue 10a and the longitudinal central axis) bisects the angle subtended and the distance between the extremities of the deformable region 20a.

Figure 7:
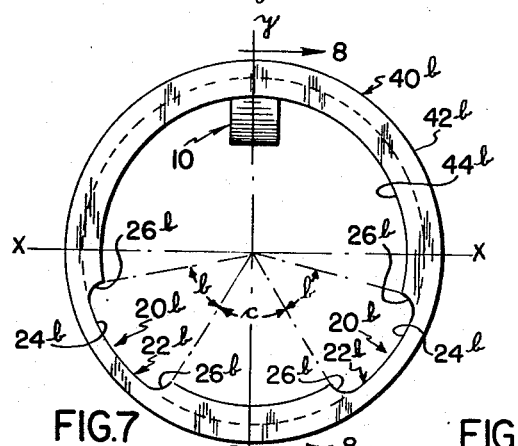
FIG. 7 is an enlarged elevation view of another modification of the fastening device made in accordance with the invention.
Figure 8:
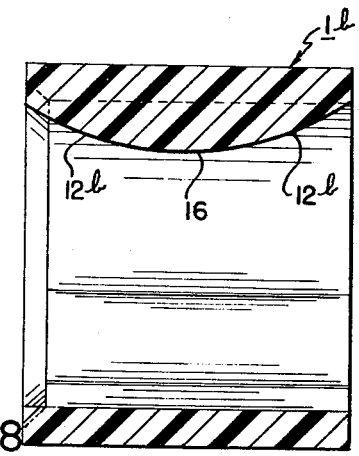
FIG. 8 is a vertical section view taken along the line 8—8 of FIG. 7.
Figure 9:
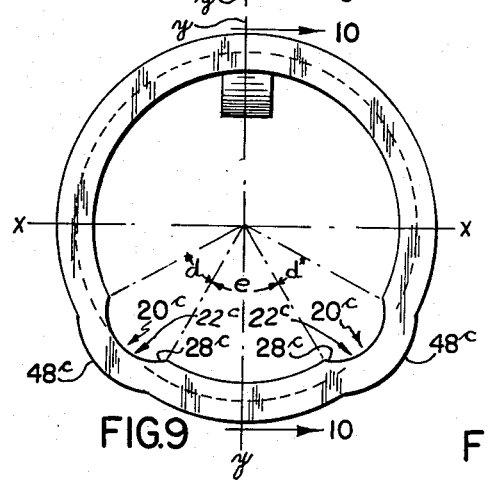
FIG. 9 is an enlarged elevation view of a further modification of the fastening device made in accordance with the invention.
Figure 10:
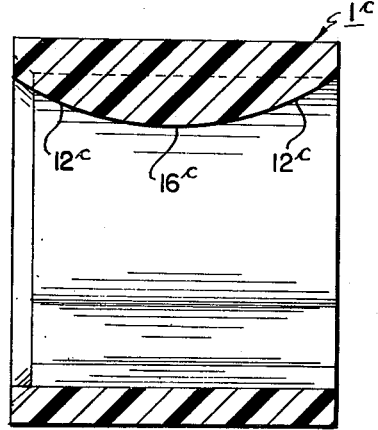
FIG. 10 is a vertical section view taken along the line 10—10 of FIG. 9.

The embodiments of FIGS. 7 and 8 and that of FIGS. 9 and 10 are generally similar to those of FIGS. 2 to 4 and 5 and 6, except that a plurality of deformable regions 20b, 20c are provided and the connstruction of the tongue 10b, 10c is of a modified construction.

In the embodiment of FIGS. 7 and 8 (wherein like elements are designated by like reference numerals bearing a $b$ suffix) two deformable regions 20b are provided of construction similar to that of the embodiment of FIGS. 2 to 4. These deformable regions 20b comprise shallow longitudinal recesses or grooves 22b with curved bottom surfaces 24b and curved or rounded interior edges 26b. However, these recesses 22b subtend individual included angles $b$ which are smaller than that of the embodiment of FIGS. 2 to 4, being preferably approximately 45°. The included angle $c$ between the inner, adjacent extremities of these recesses 22b is bisected by the vertical plane Y—Y (which includes the tongue 10b and the longitudinal central axis) so that they are symmetrically disposed with respect thereto. The included angle is preferably approximately 60°. Hence, where a plurality of deformable regions, such as 20b, are provided, it is preferred that they be symmetrically disposed with respect to the radial plane through which the tongue, such as 10b, extends.

As may be seen with reference to FIG. 8, the integral tongue 10b is of a convexly curved configuration which provides an apex 16 at the mid-portion of the fastening device 1b. A curved trailing edge 12b is provided at the end of the device 1b adjacent the beveled edge 30, while the leading edge 12b at the end remote therefrom is also curved in a manner corresponding to the trailing edge thereof.

The embodiment of FIGS. 9 and 10 (wherein like elements are designated by like reference numerals bearing a $c$ suffix) is generally similar to that of FIGS. 7 and 8, except for the arcuate configuration of the recesses 22c, the presence of the corresponding bulges 48c, and the dispositions thereof. As in the embodiment of FIGS. 7 and 8, there are two deformable regions 20c which each comprise an arcuate recess 22c defined by the curved surface 28c and a corresponding arcuate bulge 48c, each of which are configured in a manner similar to that of the embodiment of FIGS. 5 and 6. The arcuate recesses 22c preferably subtend included angles $d$ of approximately 35°. The included angle $e$ between the inner, adjacent extremities of these recesses 22c is preferably approximately 55°, being bisected by the vertical plane Y—Y (which includes the tongue 10c and the longitudinal central axis). Hence, the same symmetric disposition of the deformable regions 20c obtains as in the embodiment of FIGS. 7 and 8. The tongue 10c of this embodiment is generally similar to that of the embodiment of FIGS. 7 and 8.

The modifications in structure in the embodiments of FIGS. 5 and 6, FIGS. 7 and 8 and FIGS. 9 and 10 give rise to certain modifications in function. The convexly curved tongues 10b and 10c of FIGS. 7 to 10 permit progressive resilient spring biasing from the outer terminus of the leading edge 12b until the apex 16 is reached. In addition, this form of tongue permits reversible use of the fastening device 1b, 1c by permitting entry of the hub 9 of the rotatable member 2 either through the end of the device 1b, 1c with the beveled edge 30 or that end remote therefrom. The arcuately configured recesses 22a, 22c and corresponding bulges 48, 48c of the embodiments of FIGS. 5 and 6 and FIGS. 9 and 10 permit a radially inward deformation of the deformable region 20a, 20c in a manner tending toward concentricity with the collar 40a, 40c which reduces the circumferential tension present. Symmetric disposition of the deformable region or regions provides an equal tension on both sides of the tongue so that it is not deformed in a non-radial manner and sheared or damaged. Through the use of a plurality of deformable regions 20b, 20c as in the embodiments of FIGS. 7 to 10, an increased resilient expansion may be achieved without weakening the collar of the device.

By the foregoing arrangement, the fastening device of the present invention is capable of connecting a rotatable member to a shaft without backlash or scoring of the parts.

The terms and expressions which have been used are used as terms of description and not of limitation, and there is no intention in the use of such terms and descriptions of excluding any equivalents of any of the features shown and described, or portions thereof, and it is recognized that various modifications are possible within the scope of the invention claimed.

I claim:
1. A fastening device for connecting a rotatable member and a shaft or the like together, as a unit, in non-rotatable relation with respect to one another comprising,
   a generally endless cylindrical collar made from a deformable synthetic resin material,
   an integral tongue means projecting radially inwardly from the inner periphery of said collar and axially along a plane generally containing the longitudinal central axis of said collar and terminating short of said axis and with the ends of said collar defining the limits of axial extent of said tongue,
   at least one relatively deformable region formed in said collar, and
   said deformable region being defined by an elongated recess extending axially of said collar along its inner peripheral surface on the side of said collar generally opposite from said tongue means to enable resilient biasing of said tongue means radially outwardly with respect to said shaft by resilient elongation of said collar in said plane and through said deformable region.
2. A fastening device in accordance with claim 1, wherein
   said deformable region defined by said recess has a reduced radial thickness as compared to the corresponding thickness of the remaining portion of said collar.
3. A fastening device in accordance with claim 1, wherein
   said recess extends axially along the entire length of said collar so as to open onto the opposed ends thereof.
4. A fastening device in accordance with claim 1, wherein
   said recess comprises a curved bottom surface and a pair of oppositely disposed curved interior edges.
5. A fastening device in accordance with claim 1, wherein
   said recess comprises a curved surface having an arcuate configuration, and
   wherein said deformable region includes a correspondingly configured bulge portion on the outer peripheral surface of said collar.
6. A fastening device in accordance with claim 4, wherein
   said collar is provided with a plurality of deformable regions, and
   said regions being symmetrically disposed with respect to the planar extension of said radial plane.
7. A fastening device in accordance with claim 5, wherein
   said collar is provided with a plurality of deformable regions, and
   said regions being symmetrically disposed with respect to the planar extension of said radial plane.
8. A fastening device in accordance with claim 1, wherein
   said tongue means includes a linearly extending inclined leading edge and an axially extending edge.
9. A fastening device in accordance with claim 1, wherein
   said tongue means includes a convexly curved edge surface, said edge surface comprising a curved leading edge, an apex and a curved trailing edge.
10. A fastening device in accordance with claim 1, including in combination,
    a rotatable member of the type having an axial extending and slotted bore with stop surface on the interior thereof, and
    a shaft member with a correspondingly shaped stop surface on the exterior thereof inserted in the bore of said rotatable member, the collar of said device being disposed around said rotatable member with said tongue means disposed through the slot in said bore and in resilient biasing engagement with said shaft for holding said stop surfaces in engaged locking relation, and with said deformable region being resiliently deformed relative to said rotatable member for resilient clamping securement of said shaft with said rotatable member.

References Cited

UNITED STATES PATENTS

| | | | |
|---|---|---|---|
| 2,548,874 | 4/1951 | Darwin | 85—8.8 |
| 2,570,003 | 10/1951 | Palmer | 85—8.8 XR |
| 2,676,049 | 4/1954 | Wurzel | 85—8.8 XR |
| 2,838,820 | 6/1958 | Hakanson | 85—8.8 XR |
| 3,154,051 | 10/1964 | Durst et al. | 74—553 XR |

FOREIGN PATENTS

| | | |
|---|---|---|
| 915,356 | 7/1946 | France. |
| 1,020,017 | 2/1966 | Great Britain. |

DAVID J. WILLIAMOWSKY, Primary Examiner

A. V. KUNDRAT, Assistant Examiner

U.S. Cl. X.R.

74—553